US008368711B2

(12) United States Patent
Zhao et al.

(10) Patent No.: US 8,368,711 B2
(45) Date of Patent: Feb. 5, 2013

(54) METHODS AND APPARATUS TO PROVIDE DYNAMIC MESSAGING SERVICES

(75) Inventors: Jerry Zhao, Shanghai (CN); Michael A. Rothman, Puyallup, WA (US); Vincent J. Zimmer, Federal Way, WA (US); Qian Quyang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 877 days.

(21) Appl. No.: 11/426,727

(22) Filed: Jun. 27, 2006

(65) Prior Publication Data

US 2007/0300189 A1 Dec. 27, 2007

(51) Int. Cl.
G09G 5/00 (2006.01)

(52) U.S. Cl. ........................................ 345/581; 705/14.4

(58) Field of Classification Search .................. 345/581; 705/14.4
See application file for complete search history.

(56) References Cited

U.S. PATENT DOCUMENTS

| | | | |
|---|---|---|---|
| 6,219,028 B1 * | 4/2001 | Simonson ..................... | 715/862 |
| 6,222,520 B1 * | 4/2001 | Gerszberg et al. ........... | 715/784 |
| 6,285,985 B1 * | 9/2001 | Horstmann ................. | 705/14.61 |
| 6,928,615 B1 * | 8/2005 | Haitsuka et al. ............. | 715/738 |
| 2003/0018527 A1 * | 1/2003 | Filepp et al. ................. | 705/14 |
| 2004/0249708 A1 * | 12/2004 | Jacobs et al. ................ | 705/14 |
| 2006/0146057 A1 * | 7/2006 | Blythe .......................... | 345/506 |
| 2006/0271425 A1 * | 11/2006 | Goodman et al. ............ | 705/14 |

OTHER PUBLICATIONS

Cringely, Robert X. "There Is No Such Thing as a Free PC: Why This Week's Flurry of Free Computer Hardware Isn't for Real and Probably Isn't for You." PBS.org. PBS, Feb. 11, 1999. Web. Sep. 21, 2010. <http://www.pbs.org/cringely/pulpit/1999/pulpit_19990211_000600.html>.*
"Freepc.com." Freepc.com. Internet Archive, Jan. 26, 2004. Web. Sep. 21, 2010. <http://web.archive.org/web/20040126011645/http://freepc.com/>.*
"BBC News | The Company File | Free Computers . . . with Ads!" BBC News—Home. BBC.com, Feb. 8, 1999. Web. Sep. 24, 2010. <http://news.bbc.co.uk/2/hi/business/275213.stm>.*
Junnarkar, Sandeep. "Site Jams after Startup Plans PC Giveaway—CNET News." Technology News—CNET News. Feb. 8, 1999. Web. Sep. 24, 2010. <http://news.cnet.com/Site-jams-after-startup-plans-PC-giveaway/2100-1017_3-221326.html>.*
XP-002443319, User's Manual, VMWare Workstation, Version 3.2, Copyright 1998-2002, 420 pages.
Communication mailed on Jan. 8, 2008, in corresponding European Patent Application No. 07252605.6, 6 pages.
Communication mailed on Jan. 8, 2008, in corresponding European Patent Application No. 07252605.6, 1 page.
Extensible Firmware Interface Specification, Intel Corporation, Version 1.10, Dec. 1, 2002, 1084 pages.
Extensible Firmware Interface Specification, Version 1.10, Specification Update, Intel Corporation, Version—001, Nov. 26, 2003, 63 pages.

(Continued)

Primary Examiner — Xiao M. Wu
Assistant Examiner — Scott E Sonners
(74) Attorney, Agent, or Firm — Hanley, Flight & Zimmerman, LLC (57) ABSTRACT

Methods and apparatus to provide dynamic messaging services are disclosed. One example method includes determining supported dimensions for display of information on a display screen, restricting the supported dimensions, wherein the restricted dimensions define a boundary between a first screen portion and a second screen portion, and displaying content of a first type on a first side of the boundary and displaying a content of a second type on a second side of the boundary. Other embodiments are described and claimed.

23 Claims, 7 Drawing Sheets

OTHER PUBLICATIONS

"How to Remove free-pc.com Software," Computing.net. Posted on Nov. 19, 2002, retrieved from <http://www.computing.net/answers/windows-95/how-to-remove-freepccom-software/132150.html> (4 pages).

"Help Me Remove My FreePC Software From WIN98," Google Cache of <www.experts-exchange.com/OS/Microsoft_Operating_Systems/Windows/98/Q_20413110.html> from Dec. 2, 2002, (13 pages).

* cited by examiner

METHODS AND APPARATUS TO PROVIDE DYNAMIC MESSAGING SERVICES

TECHNICAL FIELD

The present disclosure pertains to processing systems and, more particularly, to methods and apparatus to provide dynamic messaging services.

BACKGROUND

Browsing networks, such as the Internet (also referred to as the "world-wide-web" or the "web"), for information has become a very popular technique for carrying out research activities. The Internet includes servers providing numerous sources of information for almost every topic imaginable. In addition to research activities, browsing Internet sites, which is commonly referred to as Internet surfing, has become a popular pastime.

Browsing Internet sites has achieved such a cultural status that public libraries and other publicly available resources now provide numerous terminals at which Internet browsing may be carried out. Additionally, many commercial establishments now provide web browsing capabilities. Internet cafés (I-Cafés) provide network connections to the Internet while patrons enjoy other products provided by the business. For example, a coffee shop or other business may include I-café functionality so that customers can browse the Internet while they enjoy their coffee. Furthermore, Internet access is now usually available at hotels.

In general, it is desirable to provide additional or auxiliary information to persons browsing the Internet. This information may take many forms, such as information on local events, alerts, or advertising. As will be readily appreciated by those having ordinary skill in the art, pop-up advertising in one popular technique for providing advertisements to persons browsing Internet web sites. For example, when a user directs his or her browser-equipped personal computer to logon to a desired web site to view requested information or content, the desired web site may cause the browser in use to open an additional pop-up window in which an advertisement is displayed. The user must then close the window including advertisement to resume viewing the desired content.

Many users find pop-up advertisements irritating. To that end, a number of software tools have been created to stop the occurrence of pop-up advertisements. These software tools are commonly referred to as pop-up blockers, and may reside on web browser tool bars or other convenient locations that enable users to selectively invoke the pop-up blocking feature.

DETAILED DESCRIPTION

As described below, a portion of a computer system or terminal display screen may be allocated for display of information other than information requested by the user. This allocated portion of the display screen may be used for auxiliary content or information, such as, for example, advertisements that may be used to defray the cost of a network administrator (e.g., the administrator providing the terminal with which the display screen is associated). The allocation of the display screen to include portions of the display of both request content or information (e.g., or requested web page) and auxiliary content or information, may be carried out at software/firmware architecture level of the terminal that is not accessible by an end user of the computer system or terminal. Accordingly, the allocated portion of the display screen may not be eliminated through actions of the user of the display screen.

Figure 1:
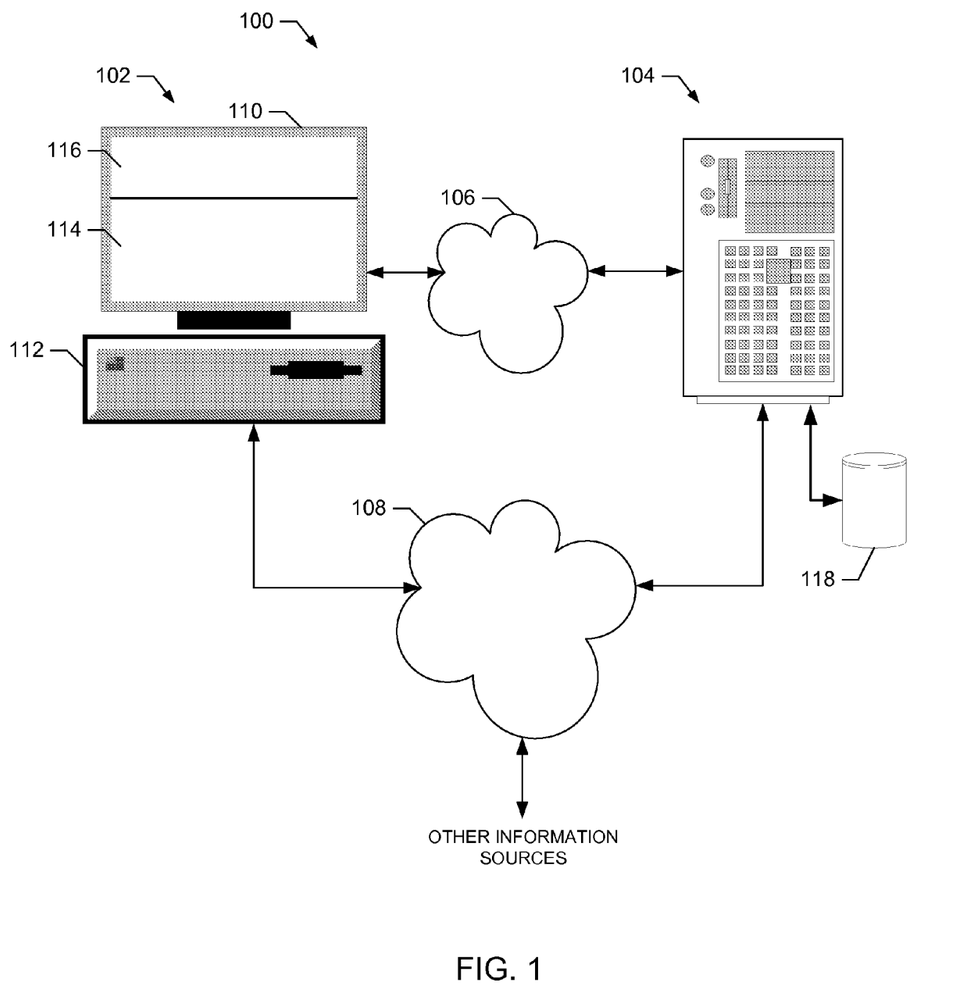
FIG. 1 is a diagram of an example network computing system.

As shown in FIG. 1, an example network computing system 100 generally includes a terminal 102 and a server 104. The terminal 102 and the server 104 may be coupled by one or more networks 106, 108. For example, the network 106 may be a local area network (LAN) or some other network configuration. The network 108 may be a network such as the Internet, which is also referred to as the World Wide Web. As will be readily appreciated by those having ordinary skill in the relevant art, other information sources such as computers, servers, and the like, may be coupled to the network 108.

In further detail, the terminal 102 includes a display screen 110 and a processing portion 112. As will be readily appreciated by those having ordinary skill in the art, the display screen 110 may be any display screen suitable to provide visual information to a viewer. For example, the display screen 110 may be a cathode ray tube (CRT), a liquid crystal display (LCD), or a display of any other suitable technology, such as a plasma display. Further, the display screen 110 may be a monitor such as is conventionally used with a personal computer, or may be a television-type display.

The processing portion 112 may include any suitable combination of hardware, software, and/or firmware. In accordance with one example, the processing portion 112 and the display screen 110 may be implemented as described below in conjunction with FIG. 8. As described below, the processing portion 112 is configured to display information in two distinct sections on the display screen 110. For example, the processing portion 112 may partition the display screen 110 into a requested content section 114 and an auxiliary information section 116. As described below, this partitioning may be sized, shaped, and located in any manner desired and carried out by the processing portion 112 in a manner that is not modifiable by the end user of the terminal 102. Thus, the end user of the terminal 102 will not be able to eliminate the auxiliary information section 116 from the display screen 110. In one example described below, the partitioning carried out by the processing portion 112 provides dynamic information throughout an entire operating system (OS) deployment through the case of billboard services in a firmware virtual machine manager. Such an example arrangement allows for the provision of continuous auxiliary information, which, if desired, may be real-time, dynamic information. Additionally, in examples with the VMM obtaining and presenting the auxiliary information, such activities are OS agnostic and, therefore, it does not matter whether the terminal (e.g., the terminal 102 of FIG. 1) uses a Windows-type OS, a Linux-type OS, or any other OS.

The server 104 may be any computing device suitable to provide information to the terminal 102. In one example implementation, the server 104 may have the architecture shown in FIG. 8. In the example of FIG. 1, the server 104 has access to auxiliary information storage 118 that is used to store information that may be presented in the auxiliary information section 116 of the display screen 110. Thus, in contrast to pop-up advertisements from an Internet browser, which are out of administrators' control, the provision of information in the auxiliary information section 116 is completely under the control of the entity that manages information on the auxiliary information storage 118.

The auxiliary information storage 118 may be located proximate the server 104, such as on a mass storage device of the server. Alternatively, the auxiliary information storage 118 may be networked to the server 104 using, for example, either or both of the networks 106, 108. For example, the auxiliary information storage 118 may reside on another server that is coupled to the server 104 via the network 108. Alternatively or additionally, more than one storage medium may be used to implement the information storage 118. For example, the auxiliary information storage 118 may be implemented as one or more networked hard drives storing databases or other data constructs including the auxiliary information.

The information stored on the auxiliary information storage 118 may be of any suitable nature, such as, for example, advertisements, service bulletins, or any other content including text and/or graphics. Additionally, the auxiliary information may be plain text, figures, voice, or multi-media. Information may be selected for storage on the auxiliary information storage 118 by a network operator (e.g., an I-café owner, an original equipment manufacturer (OEM), an Internet service provider, etc.), a network administrator, and/or an advertiser. Such entities may control the addition and removal of content from the auxiliary information storage 118 from a remote location, such as a computer terminal located remotely from the auxiliary information storage 118. In such an arrangement, such entities may upload content to the auxiliary information storage 118 so that the uploaded content may be subsequently retrieved and displayed in the auxiliary information section 116 of the display screen 110.

Figure 2:
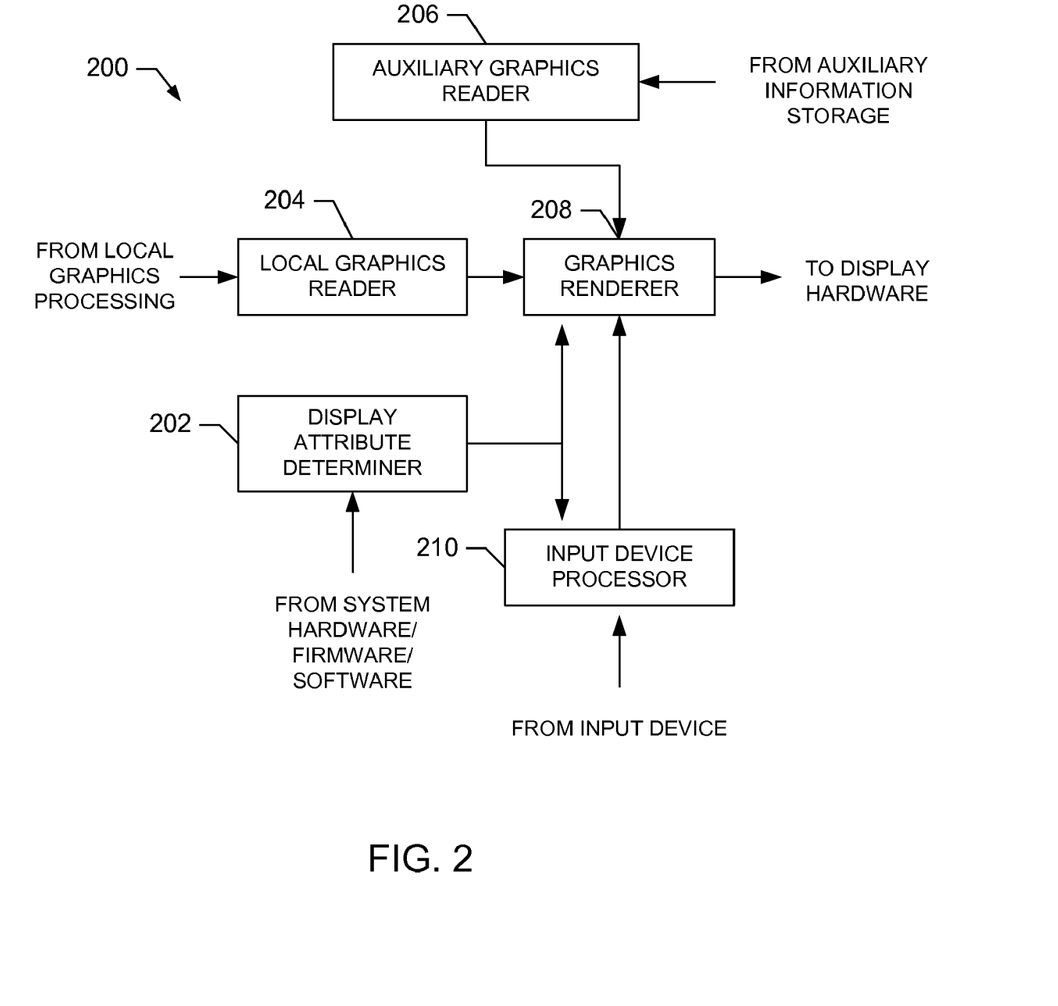
FIG. 2 is a block diagram representing the functionality of one example implementation of a dynamic messaging service.

As shown in FIG. 2, a graphics processing arrangement 200 includes a display attribute determiner 202, a local graphics reader 204, an auxiliary graphics reader 206, a graphics renderer 208, and an input device processor 210. As will be readily appreciated by those having ordinary skill in the art, items 202, 204, 206, 208, and 210 may be implemented exclusively by hardware and/or by hardware executing software and/or firmware and/or by any combination of hardware, software, and/or firmware that may be implemented on, for example, the terminal 102 of FIG. 1. Additionally, some of the items of FIG. 2 may be implemented in a pre-boot (i.e., pre-OS) environment, whereas some items may be implemented in a post-boot (i.e., runtime) environment.

In operation, the display attribute determiner 202, which may be implemented with the pre-boot environment, receives information from the system (e.g., from system hardware, software, and/or firmware) and determines attributes for displaying information on the display screen. In particular, the display attribute determiner 202 may determine available display space for displaying local graphics information, such as graphics related to a software application being operated by the user of the terminal 102 of FIG. 1. In an example implementation, the display attribute determiner 202 may determine that a display screen supports a resolution of 1600×1200 pixels in size, but that a portion of that size is to be reserved for auxiliary information. Thus, the display attribute determiner 202 may determine that only 1280×1024 pixels are allocated to the display of information requested by the user of the terminal 102 and that the balance of the display screen is reserved for the display of auxiliary information, hereby determining the location and size of the auxiliary information section 116. The display attribute determiner 202 passes the display screen information to the graphics renderer 208 and the input device processor 210, the functionality of each of which is described below.

The local graphics reader 204 receives from a local graphic processing system graphics corresponding to content to be displayed in response to the actions of the user of the terminal 102. For example, if the terminal user has requested the display of a particular Internet web page or the use of a particular software application, the local graphics reader 204 receives data corresponding to the visual content corresponding to the Internet web page or the software application and passes this content to the graphics renderer 208. The information provided to the graphics renderer 208 by the local graphics reader 204 may have dimension information included therein and such dimension information may be adjusted within the graphics renderer 208 in accordance with the information provided to the graphics renderer 208 by the display attribute determiner 202.

The auxiliary graphics reader 206 receives auxiliary information from the auxiliary information storage 118, which as described in conjunction with FIG. 1, may be coupled to the terminal 102 via a server 104 and one or more networks 106, 108. The auxiliary information may be, for example, text or graphics information and may include information that is purely informational (e.g., weather reports, store hours, etc.) or may include advertising information such as promotional information and the like. The auxiliary graphics reader 206 passes the auxiliary information to the graphics renderer 208. As with the information from the local graphics reader 204, the information from the auxiliary graphics reader 206 may include dimensional information in addition to the graphics and/or text information. This dimensional information may be adjusted by the graphics renderer 208 in accordance with the information the graphics renderer 208 receives from the display attribute determiner 202.

As described above, the graphics renderer 208 receives information from both the local graphics reader 204 and the auxiliary graphics reader 206. This information (i.e.,) information provided in response to user input and auxiliary information, is modified for display on a single screen by the graphics renderer 208. For example, because the display attribute determiner 202 informed the graphics renderer 208 that the display screen was 1600×1200 pixels in size, but that only 1280×1024 pixels of that display screen is allocated to local graphics, the graphics renderer 208, in one example, adjusts the size and location of the information from the local graphics reader 204 so that such information may be located properly on the display screen. Additionally, the graphics renderer 208 may modify the auxiliary information to fit the balance of the 1600×1200 pixel screen size that is not occupied by the 1280×1024 pixels of local graphics information.

Although the provided example includes screen dimensions of 1600×1200 pixels and an allocation of 1280×1024 pixels for the display of the requested information, thereby leaving the balance of the display screen for auxiliary information, such an example is only a manner of allocating screen space. In fact, any allocation of screen space is contemplated.

For example, the requested content section 114 may be smaller or larger than the auxiliary information section 116. Additionally, the location of the auxiliary information section 116 may be above, below or to the left or right of the requested content section 114. Further, matter of the sections 114, 116 need be rectangularly shaped. In fact, the sections could be square shaped, L-shaped, or any other suitable shape.

The input device processor 210 receives information from an input device, such as a mouse or any other input device, and also receives information regarding various screen section dimensions and locations from the display attribute determiner 202. The input device processor 210 handles generation of information representing the on-screen movement corresponding to an input device, such as, for example, the movement of a cursor on a screen in response to a user's movement of a mouse input device. In particular, the input device processor 210 handles the transitions between screen sections (i.e., between the requested content section 114 and the auxiliary information section 116) because, as described herein, the administration of such sections may be handled by different entities such as a VMM or a Virtual Machine (VM). The information representative of where a cursor or any other visual indicator should be displayed is passed from the input device processor 210 to the graphics renderer 208 so that the visual indicator may be displayed on the screen.

Figure 3:
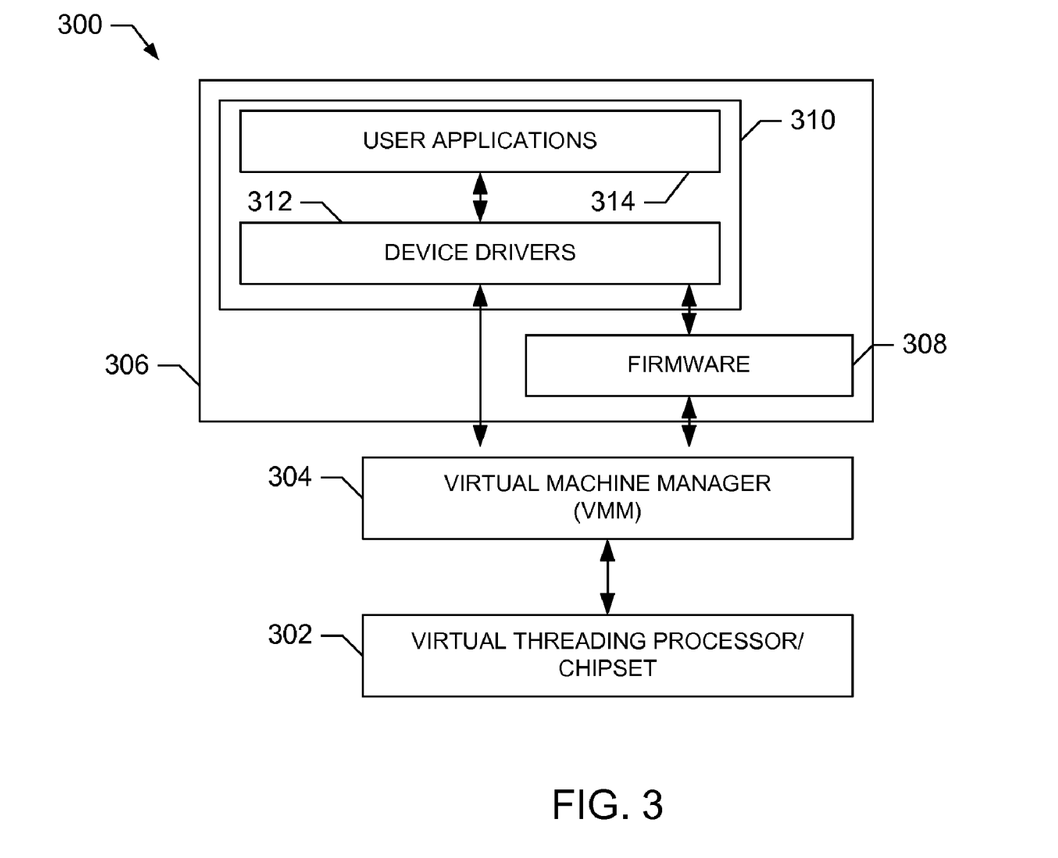
FIG. 3 is a block diagram of example software layering that may be included within the terminal of FIG. 1.

In one example, the processing portion 112 of the terminal 102 of FIG. 1 may have an architecture 300, such as that shown in FIG. 3. In particular, the architecture 300 may be based on a virtual threading processor/chipset 302 on which a VMM 304 operates. The VMM 304 supports one or more VM, one of which is shown at reference numeral 306 in FIG. 3. In one example, the VM 306 includes firmware 308 and an OS 310, which includes one or more device drivers 312 and one or more user applications 314.

The virtual threading processor/chipset 302 is a device or set of devices capable of supporting multiple threads of software execution, wherein computational resources are selectively allocated to the various threads of execution. One example virtual threading processor/chipset is the Intel Pentium 4 processor.

In one example, the VMM 304 is hardware executing software and/or firmware. As explained below, instructions may be stored in memory and executed by a processor to implement the VMM 304, as well as to control the functionality of the VMM 304. As will be readily appreciated by those having ordinary skill in the art, the VMM 304 erects and maintains a framework for managing virtual machines. In particular, the VMM 304 provides memory management, interrupt handling, and thread scheduling services to the virtual machines (e.g., the VM 306) it supports.

As described below in detail, the VMM 304 may report to the VM 306 the resources available for the execution of program instructions and/or the resources available for display of information. To that end, the VMM 304 may inform the VM 306 that a subset of resources is available when, in reality, the resources are fully available. For example, the VMM 304 may report to the VM 306 that the display screen resolution is 1280×1024 pixels in size when, in reality, the display screen is 1600×1200 pixels in size. By underreporting to the VM 306 the resources that are available, the VMM 304 can reserve such resources for its own use.

The VM 306 may be implemented using a dynamic programming language such as, for example, Java and for C#. A software engine (e.g., a Java Virtual Machine (JVM) and Microsoft .NET Common Language Runtime (CLR), etc.), which is commonly referred to as a runtime environment, executes the dynamic program language instructions of the managed application. The VM 306 interfaces dynamic program language instructions (e.g., a Java program or source code) to be executed and to a target platform (i.e., the virtual threading processor/chipset 302 and the OS 310) so that the dynamic program can be executed in a platform independent manner.

Dynamic program language instructions (e.g., Java instructions) are not statically compiled and linked directly into native or machine code for execution by the target platform (i.e., the operating system and hardware of the target processing system or platform). Native code or machine code is code that is compiled down to methods or instructions that are specific to the operating system and/or processor. In contrast, dynamic program language instructions are statically compiled into an intermediate language (e.g., bytecodes), which may interpreted or subsequently compiled by a just-in-time (JIT) compiler into native or machine code that can be executed by the target processing system or platform. Typically, the JIT compiler is provided by the VM that is hosted by the operating system of a target processing platform such as, for example, a computer system. Thus, the VM and, in particular, the JIT compiler, translates platform independent program instructions (e.g., Java bytecodes, Common Intermediate Language (CIL), etc.) into native code (i.e., machine code that can be executed by the virtual threading processor/chipset 302.

The firmware 308 within the VM 306 may be programmed to carryout tasks for the VM 306 prior to the VM 306 booting the OS 310 and its attendant device drivers 312 and user applications 314. For example, the firmware 308 may be responsible for interfacing with the VMM 304 to determine the capabilities of hardware coupled to the virtual threading processor/chipset 302. In particular, as described below, the firmware 308 may request an indication of display screen resolution from the VMM 304. The firmware 308 may store the resource indications in a memory (e.g., random access memory (RAM)), so that when the OS 310 boots, the OS 310 will be aware of the system resources at its disposal.

As will be readily appreciated by those having ordinary skill in the art, the OS 310 may include the device drivers 312 that are in communication with the user applications 314. The loading of the OS 310 causes the architecture 300 to leave the pre-boot phase of operating and to enter the runtime operating phase. The OS 310 learns what resources are at its disposal by reading the memory locations into which the firmware 308 stored the system information provided by the VMM 304. Alternatively, the OS 310 may communicate directly with the VMM 304 to obtain an indication of the available resources. The OS 306 is told what hardware resources are available by either the memory manipulated by the firmware 308 or by the VMM 304 and, thus, the OS 306 may be under an assumption that fewer or different resources are available than those resource actually available. For example, the memory location associated with the system and/or the VMM 304 may inform the OS 310 that the available space on the display screen is smaller than the actual available space on the display screen. Thus, the OS 310 will only attempt to write graphics to the reduced available space, thereby leaving a portion of the available space for other use by another entity such as the VMM 304.

Having described the architecture of one example system that may be used to provide dynamic messaging services, various processes are described. Although the following discloses example processes, it should be noted that these processes may be implemented in any suitable manner. For example, the processes may be implemented using, among other components, software, or firmware executed on hardware. However, this is merely one example and it is contemplated that any form of logic may be used to implement the systems or subsystems disclosed herein. Logic may include, for example, implementations that are made exclusively in dedicated hardware (e.g., circuits, transistors, logic gates, hard-coded processors, programmable array logic (PAL), application-specific integrated circuits (ASICs), etc.) exclusively in software, exclusively in firmware, or some combination of hardware, firmware, and/or software. Additionally, some portions of the process may be carried out manually. Furthermore, while each of the processes described herein is shown in a particular order, those having ordinary skill in the art will readily recognize that such an ordering is merely one example and numerous other orders exist. Accordingly, while the following describes example processes, persons of ordinary skill in the art will readily appreciate that the examples are not the only way to implement such processes.

Figure 4:
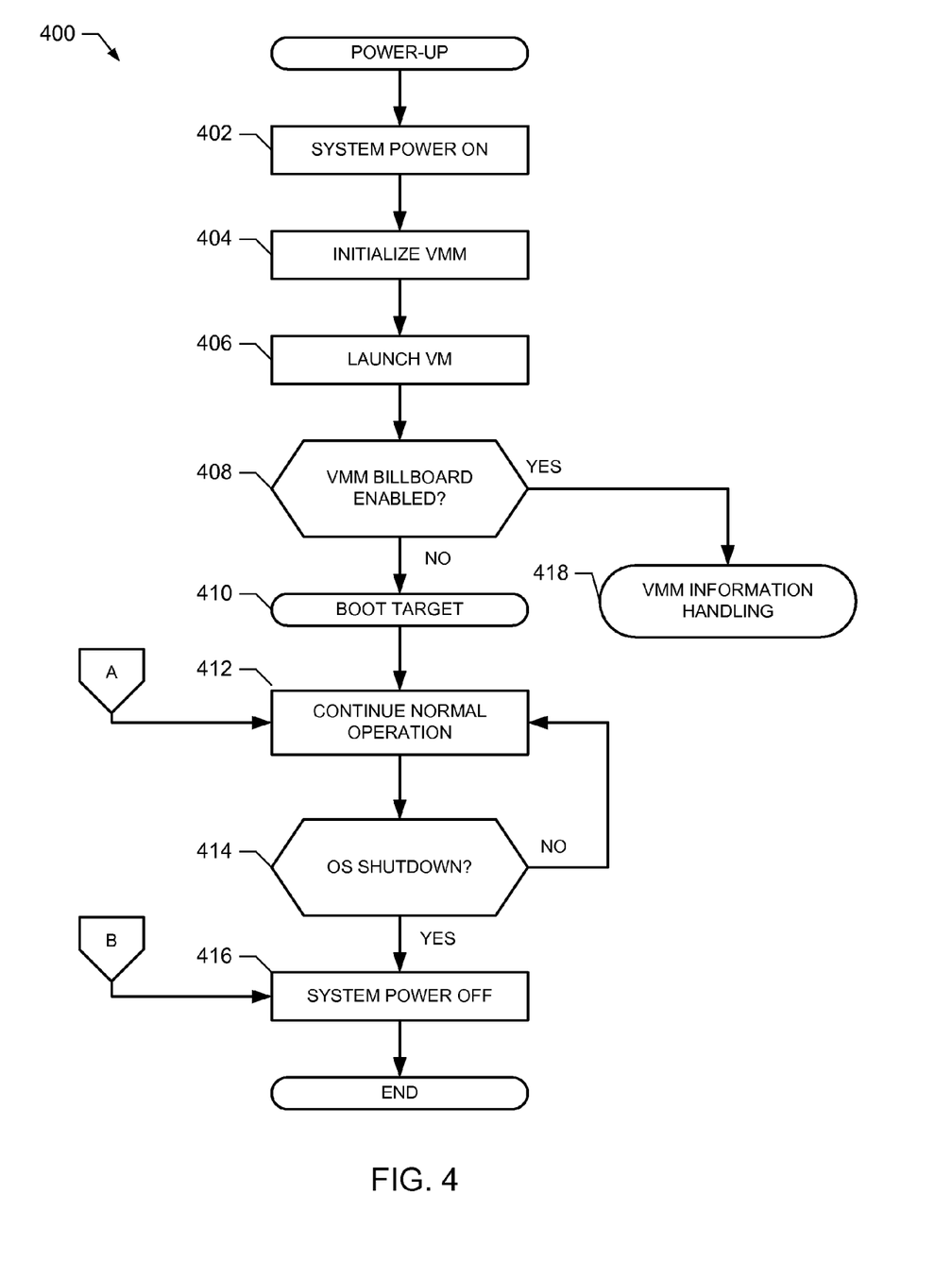
FIG. 4 is a block diagram of an example power-up process that may be carried out by the terminal of FIG. 1.

Referring now to FIG. 4, a power-up process 400 that may be carried out by a terminal, such as the terminal 102 of FIG. 1, is shown. In particular, the process 400 may be carried out by a processor system, such as the processor system 800 of FIG. 8. The power-up process 400 begins when the system powers on (block 402), which may be due to a power cycle event or due to a reset event. After the system power on (block 402), the process 400 initializes a VMM (block 404) to handle the resource allocation for one or more VMs.

After the VMM has been initialized 404, one or more VMs are launched (block 406). The process 400 then determines if the VMM billboard is enabled (block 408). The VMM billboard is a reference to dedicated screen space (i.e., the auxiliary information space 116 on the display screen 110 of FIG. 1) that is allocated to the display of auxiliary information.

If the VMM billboard is not enabled (block 408), the process continues its normal booting operation by booting a target OS (block 410) and continuing normal operation (block 412) until the OS shuts down (block 414). When the OS shuts down (block 414), the system powers off (block 416) and the process 400 ends.

Alternatively, if the VMM billboard is enabled (block 408), a VMM information handling process (block 418) is started. The VMM information handling process (block 418) may be carried out by the VMM, such as the VMM initialized at block 404 of FIG. 4.

Figure 5:
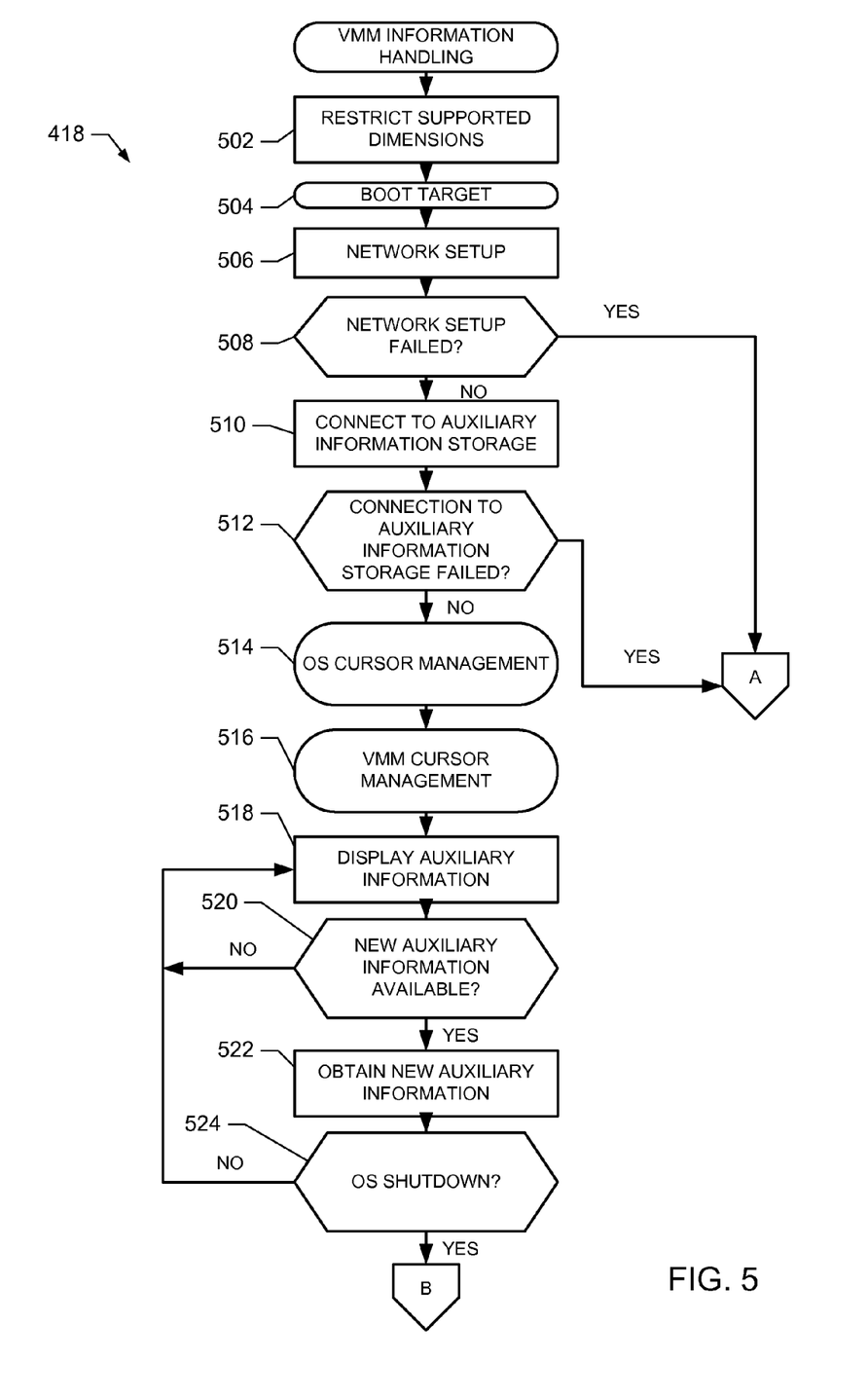
FIG. 5 is a block diagram of an example virtual machine manager (VMM) information handling process.

As shown in FIG. 5 in further detail, according to one example, the VMM information handling process 418 begins by restricting the supported dimensions that are reported when an OS seeks to determine the supported dimensions of the display screen (block 502). According to one example, the process 418 may query hardware, such as a graphics display card, to determine the resolution and dimensional capabilities of such hardware. The supported dimensions are then restricted in accordance with the screen space that is to be allocated to the auxiliary information. For example, if the supported dimensions are 1600×1200 pixels, the process 418 may report that the supported dimension is 1280×1024 pixels. Thus, when the OS and its attendant hardware and software of a VM prepare to display information on the screen, the dimensions used for displaying information on the screen are 1280×1024 pixels.

After the supported dimensions have been restricted (block 502), a target is booted (block 504). The booting of the target causes an OS to be loaded on a VM, such as one of the VMs launched at block 406 of FIG. 4.

After or during booting of the target (block 504), the network connection is set up (block 506) to provide the process 418 access to auxiliary information, such as auxiliary information stored in the auxiliary information storage 118 of FIG. 1. For example, with reference to FIG. 1, the network connection may connect the terminal 102 to either or both of the network 106 and/or the network 108. The process then determines if the network setup attempted at block 506 failed (block 508). If the network setup failed (block 508), the system continues normal operation in the OS present domain (block 412 of FIG. 4).

If, however, the network setup did not fail (block 508) the process 418 attempts to connect to the auxiliary information storage (block 510) and the process 418 determines whether the connection to the auxiliary information storage failed (block 512). If the connection to the auxiliary information storage failed (block 512), the system continues normal operation in the OS present domain (block 412 of FIG. 4).

Alternatively, if the connection to the auxiliary information storage did not fail (block 512), the process 418 initiates the OS cursor management process (block 514). The initiation of the process 514 may include passing a request or instruction from the VMM to the VM running the OS so that the OS can run the OS cursor management process 514. After the OS cursor management process 514 is initiated, the process 418 commences a VMM cursor management process 516. Further detail regarding each of the processes 514 and 516 is provided below in conjunction with FIGS. 6 and 7.

Once the cursor management processes 514 and 516 have been initiated, the process 418 obtains and displays the auxiliary information (block 518). In one example, obtaining the auxiliary information may include downloading the auxiliary information from a remote physical location such as the auxiliary information storage and/or may include recalling the auxiliary information from a location that is local to the terminal 102. In one example, the auxiliary information that is obtained may be personal in nature and may be keyed to a login type or username used to log into the terminal 102 of FIG. 1. For example, if an I-Café owner registers users with some demographic information such as age/job/school major/etc., the auxiliary information may be targeted to that user when the user arrives at the terminal in question.

After auxiliary information is displayed (block 518), the process 418 determines whether new auxiliary information is available (block 520). If no new auxiliary information is available (block 520), the process 418 continues to display the previously-obtained auxiliary information (block 518). However, if new auxiliary information is available (block 520), the process 418 obtains the new auxiliary information (block 522) and, if the OS is not going to shut down (block 524), displays the auxiliary information obtained at block 522. In one example, the originally obtained auxiliary information may be continuously displayed until a user clicks or otherwise selects the auxiliary information section 116 of FIG. 1. As noted above, the process 418 may obtain the auxiliary information by downloading and/or recalling the auxiliary information from memory.

If, however, the process 418 determines that the OS is to be shut down (block 524), the OS shuts down and the system powers off as shown at block 416 of FIG. 4.

While the foregoing describes an example in which auxiliary information is handled by a VMM, other techniques for handling auxiliary information are possible. For example, a second virtual machine may be provided and the VMM may restrict the supported dimensions of the second virtual machine. Thus, the VMM may determine the overall dimensions supported by the display device and may partition the supported dimensions of the display by restricting the dimensions provided to each of the first and second virtual machines. In this way, the first virtual machine may provide content for a first portion of the display screen (e.g., the requested content) and the second virtual machine may provide content for a second portion of the display screen (e.g., the auxiliary content).

Figure 6:
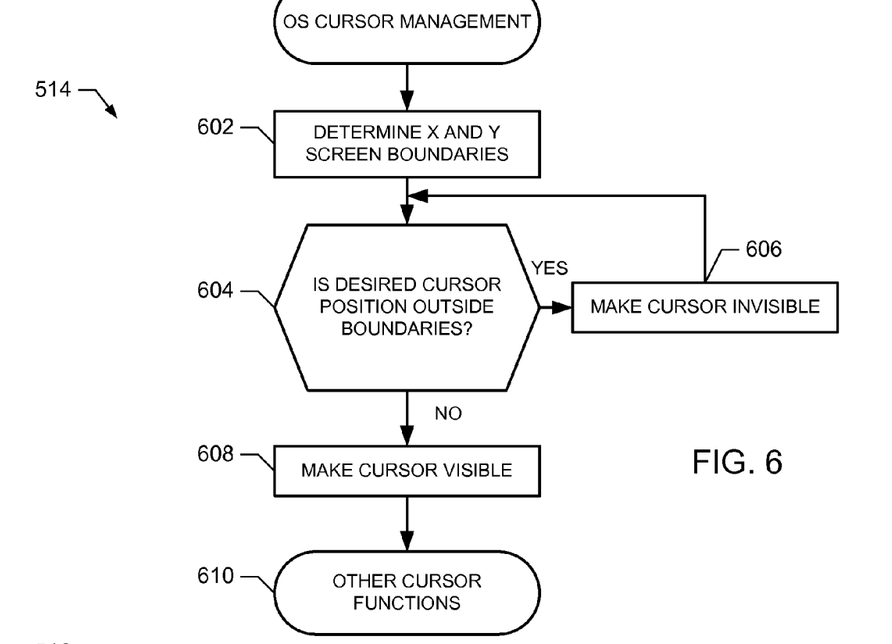
FIG. 6 is a block diagram of an example operating system (OS) cursor management process.
Figure 7:
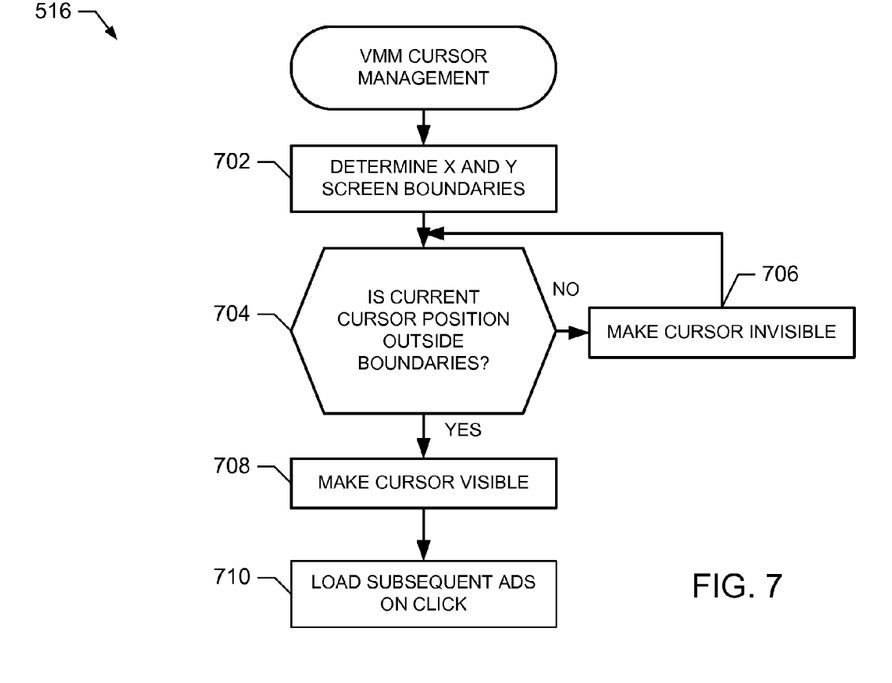
FIG. 7 is a block diagram of an example VMM cursor management process.

Example OS and VMM cursor management processes are now described in further detail. In general, when the cursor lies within the screen boundary allocated to the OS and the VM, the cursor is made visible by the OS. However, when the user attempts to move the cursor off the screen allocated to the OS and VM and into the screen portion allocated to the auxiliary information and the VMM, the OS makes the cursor invisible within the screen allocated to the OS so that the cursor does not appear to be stuck at the boundary separating the screen portion allocated to the OS.

As shown in FIG. 6, the OS cursor management process 514 begins by determining the boundaries for the screen allocated to the OS (block 602). The process 514 then determines if the desired cursor position desired by the user is outside the boundaries (block 604). The desired cursor position may be determined by tracking the cursor position and the extent to which the user has moved the mouse a distance past the boundary between the desired content section (e.g., the section 114 of FIG. 1) and an auxiliary information section (e.g., the section 116 of FIG. 1). If the desired cursor position is outside the boundary, the OS makes the cursor invisible by making the coloring and texturing of the cursor match the coloring and texturing of the graphics behind the cursor (block 606). In the alternative, if the desired cursor position is not outside the boundaries (block 604), the process 514 makes the cursor visible (block 608). After the cursor is made visible, other cursor functions are carried out (block 610), which may include conventional cursor functions that are performed by an OS to provide cursor functionality.

As shown in FIG. 7, in one example the VMM cursor management process 516 determines the screen boundaries that were passed to the OS (block 702). This determination identifies the location of the desired content section and the location of the auxiliary information section. The process 516 then determines whether the cursor is in a position outside the boundaries (i.e., that the cursor is within the auxiliary information section (block 704). If the cursor is not outside the boundaries (i.e., is within the desired content section) (block 704), the process 516 makes the cursor invisible (block 706) so that when the cursor is within the desired content section, another cursor is not shown at the boundary the desired content section and the auxiliary information section. The techniques for making the cursor invisible are well known, some of which are described above.

When the cursor transitions to a location outside the boundaries (i.e., the cursor is outside of the desired content section and, therefore, is inside of the auxiliary information section) (block 704), the process 516 makes the cursor visible (block 708). Optionally, when the cursor is within the auxiliary information section, subsequent or different information may be loaded into the auxiliary information section in response to a user click within the auxiliary information section (block 710).

Figure 8:
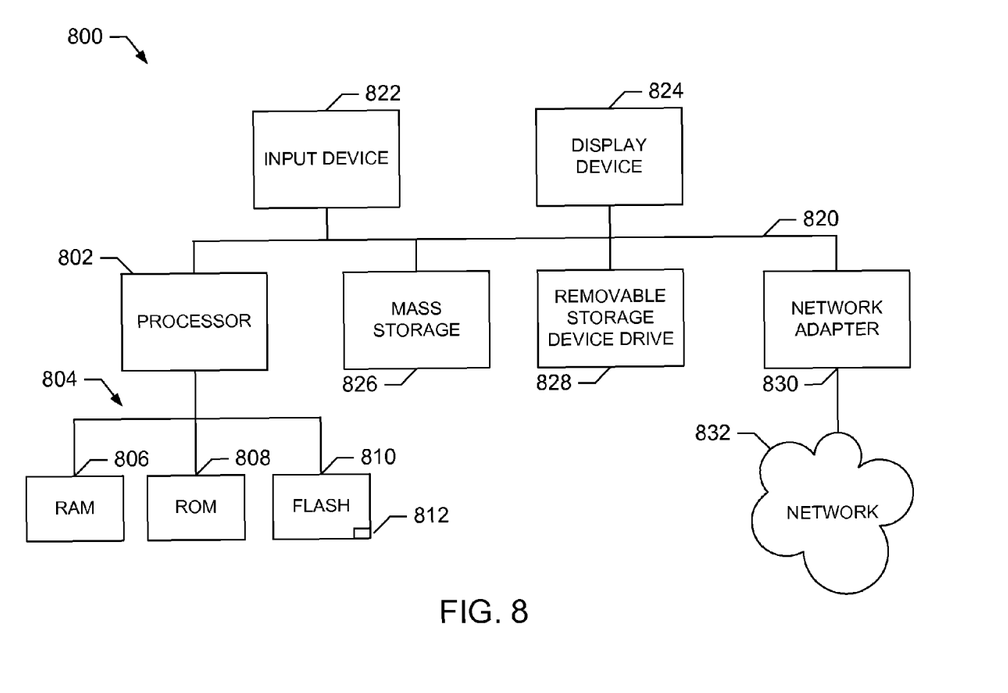
FIG. 8 is a block diagram of an example processor system on which the processes of FIGS. 4-7 may be implemented.

As shown in FIG. 8, an example processor system 800, includes a processor 802 having associated memories 804, such as a random access memory (RAM) 806, a read only memory (ROM) 808, and a flash memory 810. The flash memory 810 of the illustrated example includes a boot block 812. The processor 802 is coupled to an interface, such as a bus 820 to which other components may be interfaced. In the illustrated example, the components interfaced to the bus 820 include an input device 822, a display device 824, a mass storage device 826, and a removable storage device drive 828. The removable storage device drive 828 may include associated removable storage media (not shown), such as magnetic or optical media. The processor system 800 may also include a network adapter 830.

The example processor system 800 may be, for example, a server, a remote device, a conventional desktop personal computer, a notebook computer, a workstation or any other computing device. The processor 802 may be any type of processing unit, such as a microprocessor from the Intel Pentium family of microprocessors, the Intel® Itanium family of microprocessors, and/or the Intel XScale® family of processors. The processor 802 may include on-board analog-to-digital (A/D) and digital-to-analog (D/A) converters.

The memories 804 that are coupled to the processor 802 may be any suitable memory devices and may be sized to fit the storage and operational demands of the system 800. In particular, the flash memory 810 may be a non-volatile memory that is accessed and erased on a block-by-block basis.

The input device 822 may be implemented using a keyboard, a mouse, a touch screen, a track pad or any other device that enables a user to provide information to the processor 802.

The display device 824 may be, for example, a liquid crystal display (LCD) monitor, a cathode ray tube (CRT) monitor or any other suitable device that acts as an interface between the processor 802 and a user. The display device 824 includes any additional hardware required to interface a display screen to the processor 802.

The mass storage device 826 may be, for example, a conventional hard drive or any other magnetic or optical media that is readable by the processor 802.

The removable storage device drive 828 may be, for example, an optical drive, such as a compact disk-recordable (CD-R) drive, a compact disk-rewritable (CD-RW) drive, a digital versatile disk (DVD) drive, or any other optical drive. The removable storage device drive 828 may alternatively be, for example, a magnetic media drive. If the removable storage device drive 828 is an optical drive, the removable storage media used by the drive 828 may be a CD-R disk, a CD-RW disk, a DVD disk or any other suitable optical disk. On the other hand, if the removable storage device drive 48 is a magnetic media device, the removable storage media used by the drive 828 may be, for example, a diskette or any other suitable magnetic storage media.

The network adapter 830 may be any suitable network interface such as, for example, an Ethernet card, a wireless network card, a modem, or any other network interface suitable to connect the processor system 800 to a network 832. The network 832 to which the processor system 800 is connected may be, for example, a local area network (LAN), a wide area network (WAN), the Internet, or any other network. For example, the network could be a home network, a intranet located in a place of business, a closed network linking various locations of a business, or the Internet.

Although certain apparatus constructed in accordance with the teachings of the invention have been described herein, the scope of coverage of this patent is not limited thereto. On the contrary, this patent covers every apparatus, method and article of manufacture fairly falling within the scope of the appended claims either literally or under the doctrine of equivalents.

What is claimed is:
1. A method of displaying information on a display screen, the method comprising:
  determining, in a pre-boot environment, supported dimensions for display of information on the display screen;

restricting, in the pre-boot environment, the supported dimensions to determine restricted dimensions;

passing the restricted dimensions to an operating system of a virtual machine supported by a virtual machine manager, wherein the restricted dimensions define a boundary between a first screen portion and a second screen portion;

preventing, via the virtual machine manager, a user of the display screen from eliminating the first screen portion;

receiving at the virtual machine manager first content having a first type from a first server;

receiving, at the operating system operating on the virtual machine, second content having a second type from a second server; and displaying the first content on a first side of the boundary and displaying the second content on a second side of the boundary.

2. A method as defined in claim 1, wherein the virtual machine manager provides the content of the first type.

3. A method as defined in claim 2, wherein the operating system provides the content of the second type.

4. A method as defined in claim 2, wherein the content of the first type comprises one or more of an advertisement or a service bulletin.

5. A method as defined in claim 1, wherein a second virtual machine provides the content of the first type.

6. A method as defined in claim 1, further comprising selectively displaying a cursor on one of the first side of the boundary and the second side of the boundary.

7. A method as defined in claim 6, further comprising determining if a desired cursor position is on the first side of the boundary.

8. A method as defined in claim 7, further comprising making a cursor invisible on the second side of the boundary if the desired cursor position is on the first side of the boundary.

9. An article of manufacture comprising a machine-accessible medium comprising machine accessible instructions that, when executed, cause a machine to:

determine, in a pre-boot environment, supported dimensions for display of information on a display screen;

restrict, in the pre-boot environment, the supported dimensions to determine restricted dimensions;

pass the restricted dimensions to an operating system of a virtual machine supported by a virtual machine manager, wherein the restricted dimensions define a boundary between a first screen portion and a second screen portion;

prevent, via the virtual machine manager, a user of the display screen from eliminating the first screen portion;

receive at the virtual machine manager first content having a first type from a first server;

receive, at the operating system operating on the virtual machine, second content having a second type from a second server; and display the first content on a first side of the boundary and display the second content on a second side of the boundary.

10. A machine-accessible medium as defined by claim 9, wherein the virtual machine manager provides the content of the first type.

11. A machine-accessible medium as defined by claim 10, wherein the operating system provides the content of the second type.

12. A machine-accessible medium as defined by claim 10, wherein the content of the first type comprises one or more of an advertisement or a service bulletin.

13. A machine-accessible medium as defined by claim 9, having a plurality of machine accessible instructions that, when executed, cause a machine to selectively display a cursor on one of the first side of the boundary and the second side of the boundary.

14. A machine-accessible medium as defined by claim 13, having a plurality of machine accessible instructions that, when executed, cause a machine to determine if a desired cursor position is on the first side of the boundary.

15. A machine-accessible medium as defined by claim 14, having a plurality of machine accessible instructions that, when executed, cause a machine to make a cursor invisible on the second side of the boundary if the desired cursor position is on the first side of the boundary.

16. A system comprising:

a display attribute determiner to determine, in a pre-boot environment, supported dimensions for display of information on a display screen and to, in the pre-boot environment, restrict the supported dimensions to determine restricted dimensions;

a virtual machine manager to receive the restricted dimensions, to pass the restricted dimensions to an operating system of a virtual machine supported by the virtual machine manager, wherein the restricted dimensions define a boundary between a first screen portion and a second screen portion, and to prevent a user of the display screen is not permitted to eliminate from eliminating the first screen portion; and a graphics renderer to display first content having a first type on a first side of the boundary and display second content having a second type on a second side of the boundary, wherein the virtual machine manager receives the first content from a first server and the operating system operating on the virtual machine receives the second content from a second server.

17. A system as defined in claim 16, wherein the virtual machine manager provides the content of the first type.

18. A system as defined in claim 17, wherein the operating system provides the content of the second type.

19. A system as defined in claim 17, wherein the content of the first type comprises one or more of an advertisement or a service bulletin.

20. A system as defined in claim 16, further comprising an input device processor to selectively display a cursor in one of the first side of the boundary and the second side of the boundary.

21. A system as defined by claim 20, wherein the input device processor determines if a desired cursor position is on the first side of the boundary.

22. A system as defined by claim 21, wherein the input device processor makes a cursor invisible on the second side of the boundary if the desired cursor position is on the first side of the boundary.

23. A system as defined by claim 16, wherein the user may not modify the boundary.

* * * * *

UNITED STATES PATENT AND TRADEMARK OFFICE
CERTIFICATE OF CORRECTION

| | | |
|---|---|---|
| PATENT NO. | : 8,368,711 B2 | Page 1 of 1 |
| APPLICATION NO. | : 11/426727 | |
| DATED | : February 5, 2013 | |
| INVENTOR(S) | : Zhao et al. | |

It is certified that error appears in the above-identified patent and that said Letters Patent is hereby corrected as shown below:

In the Claims:

Column 12, line 33 (claim 16): remove "is not permitted to eliminate"

Signed and Sealed this
Twenty-fifth Day of June, 2013

Teresa Stanek Rea
*Acting Director of the United States Patent and Trademark Office*